United States Patent
Van Meter

(10) Patent No.: US 6,534,460 B1
(45) Date of Patent: Mar. 18, 2003

(54) DRY COMPOSITION AND METHOD FOR REMOVING ADHESIVES FROM SMOOTH SURFACES

(76) Inventor: Ronald L. Van Meter, 3685 Lick Creek Rd., Anna, IL (US) 62906

( * ) Notice: Subject to any disclaimer, the term of this patent is extended or adjusted under 35 U.S.C. 154(b) by 111 days.

(21) Appl. No.: 09/640,561

(22) Filed: Aug. 18, 2000

(51) Int. Cl.$^7$ .............................................. C11D 17/00
(52) U.S. Cl. ........................ 510/200; 510/201; 510/202; 510/209; 510/475; 510/509
(58) Field of Search ................................ 510/200, 201, 510/202, 209, 475, 509

(56) References Cited

U.S. PATENT DOCUMENTS

| | | | |
|---|---|---|---|
| 4,306,989 A | * | 12/1981 | Motsenbocker ............. 252/162 |
| 5,108,642 A | * | 4/1992 | Aszman et al. ................ 252/95 |
| 5,333,967 A | * | 8/1994 | Foley et al. ................. 401/139 |
| 5,525,254 A | * | 6/1996 | Reininger .................... 252/170 |
| 6,020,293 A | * | 2/2000 | Ahmed et al. .............. 510/193 |
| 6,066,615 A | * | 5/2000 | Bijl et al. .................... 510/446 |
| 6,087,310 A | * | 7/2000 | Henkel ........................ 510/138 |

* cited by examiner

Primary Examiner—Necholus Ogden
(74) Attorney, Agent, or Firm—Peter R. Bahn

(57) ABSTRACT

A pleasant smelling, non-toxic dry composition comprised of sodium bicarbonate embedded in a rubber matrix for removing adhesives from smooth surfaces is described. The composition is prepared by mixing 2 volumes of packed sodium bicarbonate with one volume of rubber cement and allowing the mixture to dry. The dry composition is dispensed from a tube type dispenser. The adhesive is removed by rubbing the dry composition against the adhesive until the smooth surface is clean.

2 Claims, 1 Drawing Sheet

DRY COMPOSITION AND METHOD FOR REMOVING ADHESIVES FROM SMOOTH SURFACES

DESCRIPTION OF THE INVENTION

Figure 3:
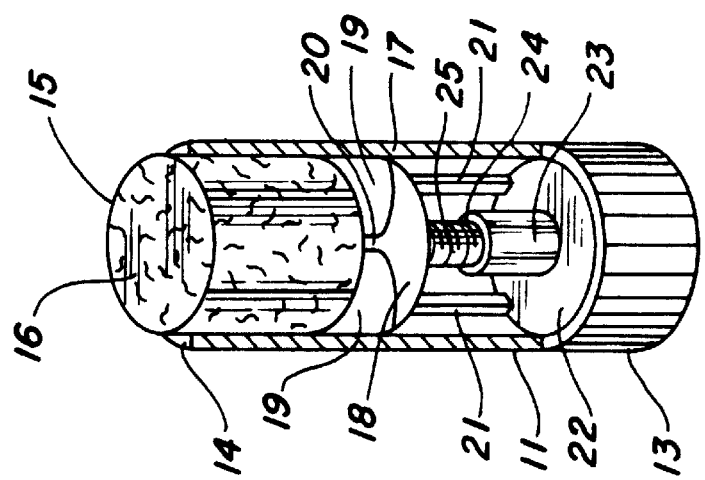

This invention is referred to in Disclosure Document Number 475867 filed in the U.S. Patent and Trademark Office on Jun. 19, 2000.

This invention fits into the general category of inventions for cleaning objects. More specifically, this invention fits into the category for removing adhesives from smooth solid surfaces. In particular, this invention comprises a composition, methods, and apparatus for removing adhesive residues from smooth solid surfaces such as glass or ceramic oven burners.

It is a common problem that often a person will wish to remove adhesives and like substances from glass, hard plastics, or other similar non-porous surfaces. The substance to be removed may be the residue associated with the removal of a sticker or tape. The substance to be removed may be a heel mark, tar, gum, or other gooey substances. The substance to be removed may be as thin as a stain or more solid in composition.

Sometimes, a person will try to remove adhesives from a smooth surface by scraping the adhesives off with a knife or a razor blade, but this method is slow and it often leaves the surface marred by unintentional cuts or abrasions.

Prior art in this area of technology includes the following: Motsenbocker in U.S. Pat. No. 4,306,989 describes a liquid composition for releasing adhesives from a surface which allows pressure sensitive labels to be lifted from a surface. His preferred water-based formulation includes xylene, kerosene, water, surfactants, and butylcellosolve. His preferred non-water based composition includes xylene, trichloroethylene, kerosene, light mineral oil, and lemon oil.

Reininger in U.S. Pat. No. 5,525,254 describes a liquid composition for removal of adhesives from tapes, labels, and stickers. His preferred formulation includes methyl ethyl ketone, xylene, toluene, and mineral spirits.

Foley, Metheney, and Tucker in U.S. Pat. No. 5,333,967 describe a method and apparatus for removing labels from surfaces. Their apparatus is designed to apply the liquid solvents hexane or heptane to the labels, whereupon the solvents loosen the label adhesives enough for the labels to be removed.

The apparatus to be described in the invention to be presented here is well known in the public domain prior art as a device for applying adhesives to surfaces, as in glue sticks and lipsticks, but does not appear before now to have been used as a device for removing adhesives from surfaces.

There are three problems with the above compositions, methods, and apparatus. First, the compositions in all three cases are in the forms of liquids containing volatile organic chemicals that are unhealthy and potentially toxic for human beings to breathe or absorb through the skin. Second, because the above compositions are liquid, they have a tendency to spread further than desired, thereby creating a mess. Third, because of the ingredients used in the above compositions, the said compositions do not have a pleasant smell unless perfumes or other pleasant smelling odorants are included in their composition. This last factor also increases the cost and complexity of their manufacture.

It is an object of the present invention to present a dry, pleasant-smelling composition for the removal of adhesives from smooth surfaces. It is a further object of the present invention to disclose a method for making the dry composition for removing adhesives from smooth surfaces. It is also an object of the present invention to describe an apparatus for using the said dry composition so as to remove adhesives from smooth surfaces. Finally, it is a further object of the present invention to describe a method for applying the dry composition so as to remove adhesives from a smooth surface.

As to the composition for removing adhesives from smooth surfaces, this inventor found by experimentation that a mixture of 2 volumes of packed sodium bicarbonate and 1 volume of rubber cement, when allowed to dry for 24 hours, forms an ideal dry composition for removing adhesives from smooth surfaces.

Sodium bicarbonate, a white crystalline compound, also known as baking soda, has the chemical formula $NaHCO_3$. Sodium bicarbonate is known to be a pleasant-smelling, completely non-toxic, mild abrasive, used both in cooking recipes and also to clean metal surfaces.

Rubber cement is a viscous liquid mixture of heptane, isopropanol, and natural rubber. Rubber is an amorphous, elastic, solid polymer of isoprene, and has the chemical formula $(C_5H_8)_n$.

When the mixture of sodium bicarbonate and rubber cement is allowed to dry for 24 hours, the heptane and isopropanol in the rubber cement evaporates out of the mixture, leaving only dry sodium bicarbonate embedded in a rubber matrix. The inventor found by experimentation that a 1:1 (vol./vol.) sodium bicarbonate:rubber cement formulation resulted in a dry composition that was too rubbery to be a good adhesive remover, and that a 3:1 (vol./vol.) sodium bicarbonate:rubber cement formulation resulted in a dry composition that was too powdery to be a good adhesive remover.

After the sodium bicarbonate has been thoroughly mixed with the rubber cement and before the mixture is allowed to dry, the mixture is poured in a cylindrical mold, whereupon it is allowed to dry for 24 hours, whereupon it has a faint, pleasant odor.

After the mixture has dried, the solidified composition is removed and placed into a tube-type apparatus, or dispenser, which will now be described.

Figure 2:
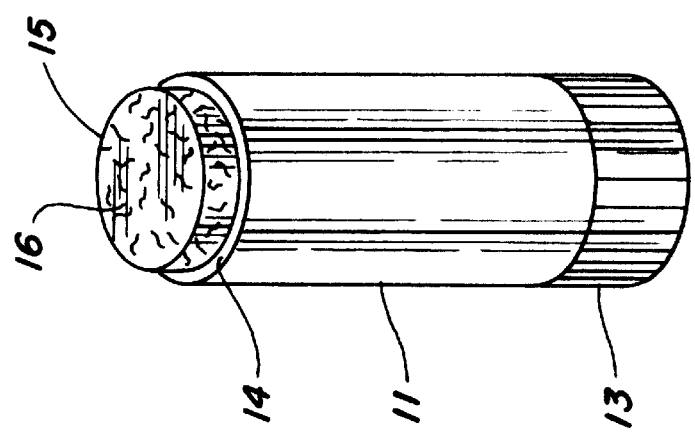
Figure 1:
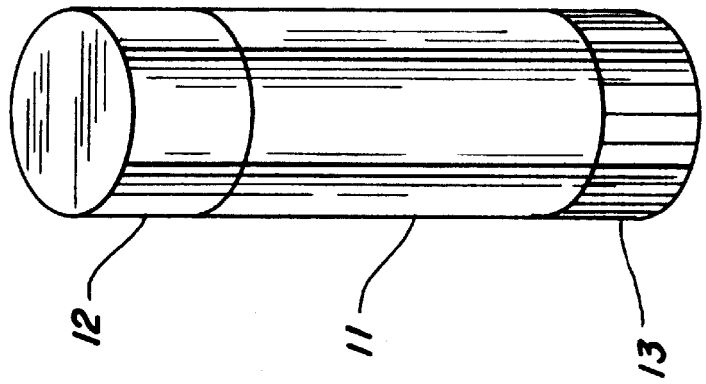

The tube-type dispenser is shown in FIG. 1, FIG. 2, and FIG. 3.

FIG. 1 shows an exterior view of the dispenser. FIG. 2 shows an exterior view of the dispenser with its cap removed and the dry adhesive-removing composition visible. FIG. 3 shows a cut-away view of the dispenser with the dry composition and the inner workings of the dispenser visible.

Referring simultaneously to FIG. 1, FIG. 2, and FIG. 3, it is seen that the dispenser apparatus is comprised of a cylindrical casing 11, a cylindrical cap 12, and a cylindrical twist knob 13.

Inside the cylindrical casing 11, sticking out a bit beyond the lip 14 of the casing 11, is the dry adhesive-removing composition 15, the top flat surface 16 of which is shown.

The dry composition 15 rests on a cylindrical plug 17 with its cylindrical surface 18. However, raised above the cylindrical plug surface 18 are three pentagonal surfaces 19 (one not visible) with three grooved slots 20 (two not visible) between the three pentagonal surfaces 19.

The three grooved slots 20 ride up and down on three rectangular ridges 21 (one not visible) lining the interior of the cylindrical casing 11. Thus, the cylindrical plug 19, on top of which rests the dry composition 15, is capable of upward movement but is not able to rotate.

The cylindrical plug with its attached adhesive remover, is moved up in the cylindrical casing by virtue of a central coaxial screw-threaded hole in its interior (not visible). Through the screw-threaded hole is a screw spindle 24 with its screw threads 25. The screw spindle 24 is capable of being screwed completely through the screw-threaded hole in the center of the plug cylinder 17 and beyond into a coaxial hole inside the adhesive remover 15.

The spindle 24 is rigidly connected to a spindle base 23, and this spindle base 23 is rigidly connected to the cylindrical twist knob 13. The spindle base 23 however is connected to the twist knob 13 through a hole in the flat bottom 22 of the cylindrical casing 11, the said hole being smaller than the bottom of the spindle base 23, so that the spindle base 23 and twist knob 13 are freely rotatable about but are not detachable from the casing base 22.

Thus, it can be seen that when the twist knob 13 is rotated in a clockwise direction relative to the casing 11, the plug 17 will rise, pushing the adhesive remover 15 further out of the casing 11.

This invention is used as follows: The user removes the cap 12, and by twisting the knob 13 in a clockwise direction, extends a small portion of the dry composition 15, thereby making contact with the adhesive to be removed with the end 16 of the extended composition 15. With a back and forth rubbing motion in the same plane as the surface being cleaned, the user applies a small amount of pressure and continues rubbing until the surface is clean.

The cleaning action occurs because of three distinct processes. First, the adhesive to be removed is cut by the mildly abrasive particles inherent to the composition 15. Second, parts of the adhesive to be removed are coated by dry particles of the composition, thus neutralizing any adhesive properties on the outside of such particles of adhesive. Third, the now coated parts of the adhesive to be removed are rolled away, thus exposing new areas to be cut, coated, and displaced.

What is claimed is:

1. A dry composition for removing an adhesive from a smooth surface, comprising a mild abrasive embedded in a rubber matrix wherein the mild abrasive is sodium bicarbonate and wherein the composition is prepared by mixing two volumes of packed sodium bicarbonate with one volume of rubber cement, and go allowing the mixture to dry.

2. A method of removing an adhesive from a smooth surface by rubbing against the adhesive a dry composition as described in claim 1 until the smooth surface is clean.

* * * * *